(12) United States Patent
Ishimatsu et al.

(10) Patent No.: US 12,202,312 B2
(45) Date of Patent: Jan. 21, 2025

(54) TORSION BEAM JOINT STRUCTURE

(71) Applicants: HONDA MOTOR CO., LTD., Tokyo (JP); F-TECH INC., Kuki (JP)

(72) Inventors: Hisashi Ishimatsu, Saitama (JP); Kei Furuki, Tochigi (JP); Daichi Oshita, Tochigi (JP)

(73) Assignees: HONDA MOTOR CO., LTD., Tokyo (JP); F-TECH INC., Kuki (JP)

( * ) Notice: Subject to any disclaimer, the term of this patent is extended or adjusted under 35 U.S.C. 154(b) by 0 days.

(21) Appl. No.: 18/530,551

(22) Filed: Dec. 6, 2023

(65) Prior Publication Data

US 2024/0190200 A1 Jun. 13, 2024

(30) Foreign Application Priority Data

Dec. 12, 2022 (JP) .................. 2022-197974

(51) Int. Cl.
*B60G 21/02* (2006.01)
*B60G 21/05* (2006.01)

(52) U.S. Cl.
CPC ......... *B60G 21/026* (2013.01); *B60G 21/051* (2013.01); *B60G 2200/21* (2013.01); *B60G 2200/22* (2013.01); *B60G 2200/23* (2013.01); *B60G 2202/134* (2013.01);
(Continued)

(58) Field of Classification Search
CPC ...... B60G 21/026; B60G 21/02; B60G 21/05; B60G 21/051; B60G 21/052; B60G 21/053; B60G 2200/23; B60G 2200/21; B60G 2200/22; B60G 2200/20; B60G 2200/24; B60G 2206/20; B60G 2206/201; B60G 2206/202; B60G 2206/203; B60G 2206/30; B60G 2206/31; B60G 2206/312; B60G 2206/32; B60G 2206/722; B60G 2204/1246; B60G 2204/1226;
(Continued)

(56) References Cited

FOREIGN PATENT DOCUMENTS

| CN | 206568834 U | * | 10/2017 | |
| CN | 216942582 U | * | 7/2022 | |
| DE | 112015003331 T5 | * | 4/2017 | ............. B60B 35/00 |

(Continued)

OTHER PUBLICATIONS

Japanese Office Action dated Apr. 2, 2024 issued in corresponding Japanese application No. 2022-197974; English machine translation included (7 pages).

*Primary Examiner* — Keith J Frisby
(74) *Attorney, Agent, or Firm* — Rankin, Hill & Clark LLP

(57) ABSTRACT

There is provided a torsion beam joint structure in a torsion beam suspension including a torsion beam and right and left trailing arms connected to end portions of the torsion beam. The torsion beam has front and rear wall portions, an upper wall portion, and an opening provided at a lower side in an upper-lower direction of the vehicle. The front wall portion and the rear wall portion have a set of joint portions on their right side and left side in the vehicle width direction, by which the front wall portion and the rear wall portion are joined to each of the trailing arms. The set of joint portions includes an outer joint portion located on an outer side at a lowermost position, and an inner joint portion located on an inner side at an uppermost position. The inner joint portion is located higher than the outer joint portion.

5 Claims, 7 Drawing Sheets

(52) U.S. Cl.
CPC .. *B60G 2202/136* (2013.01); *B60G 2206/201* (2013.01); *B60G 2206/203* (2013.01)

(58) Field of Classification Search
CPC .......... B60G 2202/13; B60G 2202/134; B60G 2202/136; B60G 2202/1362
USPC ................................... 280/124.109, 124.166
See application file for complete search history.

(56) References Cited

FOREIGN PATENT DOCUMENTS

| | | | | |
|---|---|---|---|---|
| EP | 1454776 A2 | * | 9/2004 | ........... B60G 21/051 |
| JP | 2011131700 A | * | 7/2011 | ........... B60G 21/051 |
| JP | 2015-193334 A | | 11/2015 | |
| JP | 2016-74318 A | | 5/2016 | |
| JP | 2016-112966 A | | 6/2016 | |
| KR | 20050100176 A | * | 10/2005 | |
| KR | 20220162460 A | * | 12/2022 | |

\* cited by examiner

TORSION BEAM JOINT STRUCTURE

CROSS-REFERENCE TO RELATED APPLICATION

This application claims the benefit of foreign priority to Japanese Patent Application No. 2022-197974, filed on Dec. 12, 2022, which is incorporated by reference in its entirety.

TECHNICAL FIELD

The present invention relates to a torsion beam joint structure that joins a torsion beam and a trailing arm.

BACKGROUND

For example, JP 2016-112966 A discloses a torsion beam joint structure that joins right and left end portions of a torsion beam and a pair of right and left trailing arms.

In the torsion beam joint structure disclosed in JP 2016-112966 A, a plurality of riveted joint points are provided to join each trailing arm to an end portion of the torsion beam.

However, the torsion beam joint structure disclosed in JP 2016-112966 A includes riveted joint points located at positions that limit the torsional motion of the torsion beam (i.e., at the upper surface of the torsion beam).

This can potentially restrict the torsional motion of the torsion beam and thus may result in decreased durability of the torsion beam.

The present invention has been made in view of the above-described circumstances. An object of the present invention is to provide a torsion beam joint structure that can enhance durability in the torsion mode without restricting the torsional motion of the torsion beam.

SUMMARY

To achieve the above object, an aspect of the present invention is to provide a torsion beam suspension structure comprising: a torsion beam disposed to extend in a vehicle width direction of a vehicle; a pair of right and left trailing arms connected to right and left end portions of the torsion beam. The torsion beam has a front wall portion located at a front side in a front-rear direction of the vehicle, a rear wall portion located at a rear side in the front-rear direction, and an upper wall portion connecting and bridging between the front wall portion and the rear wall portion, and the torsion beam has an opening provided at a lower side in an upper-lower direction of the vehicle, The front wall portion and the rear wall portion have a set of joint portions on their right side and left side in the vehicle width direction, by which the front wall portion and the rear wall portion are joined to each of the trailing arms. The set of joint portions includes an outer joint portion located on an outer side in the vehicle width direction and at a lowermost position, and an inner joint portion located on an inner side in the vehicle width direction and at an uppermost position. The inner joint portion is located higher in the upper-lower direction of the vehicle than the outer joint portion.

BRIEF DESCRIPTION OF THE DRAWINGS

The drawings described herein are for illustration purposes only and are not intended to limit the scope of the present invention in any way.

DETAILED DESCRIPTION

One embodiment of the present invention will be described in detail with reference to the drawings as appropriate. In each of the drawings, directions such as front and rear refer to corresponding directions in a front-rear direction of a vehicle, directions such as right and left refer to corresponding directions in a vehicle width direction (right-left direction) of the vehicle, and directions such as upper and lower refer to corresponding directions in an upper-lower direction (vertically upper-lower direction) of the vehicle.

Figure 1:
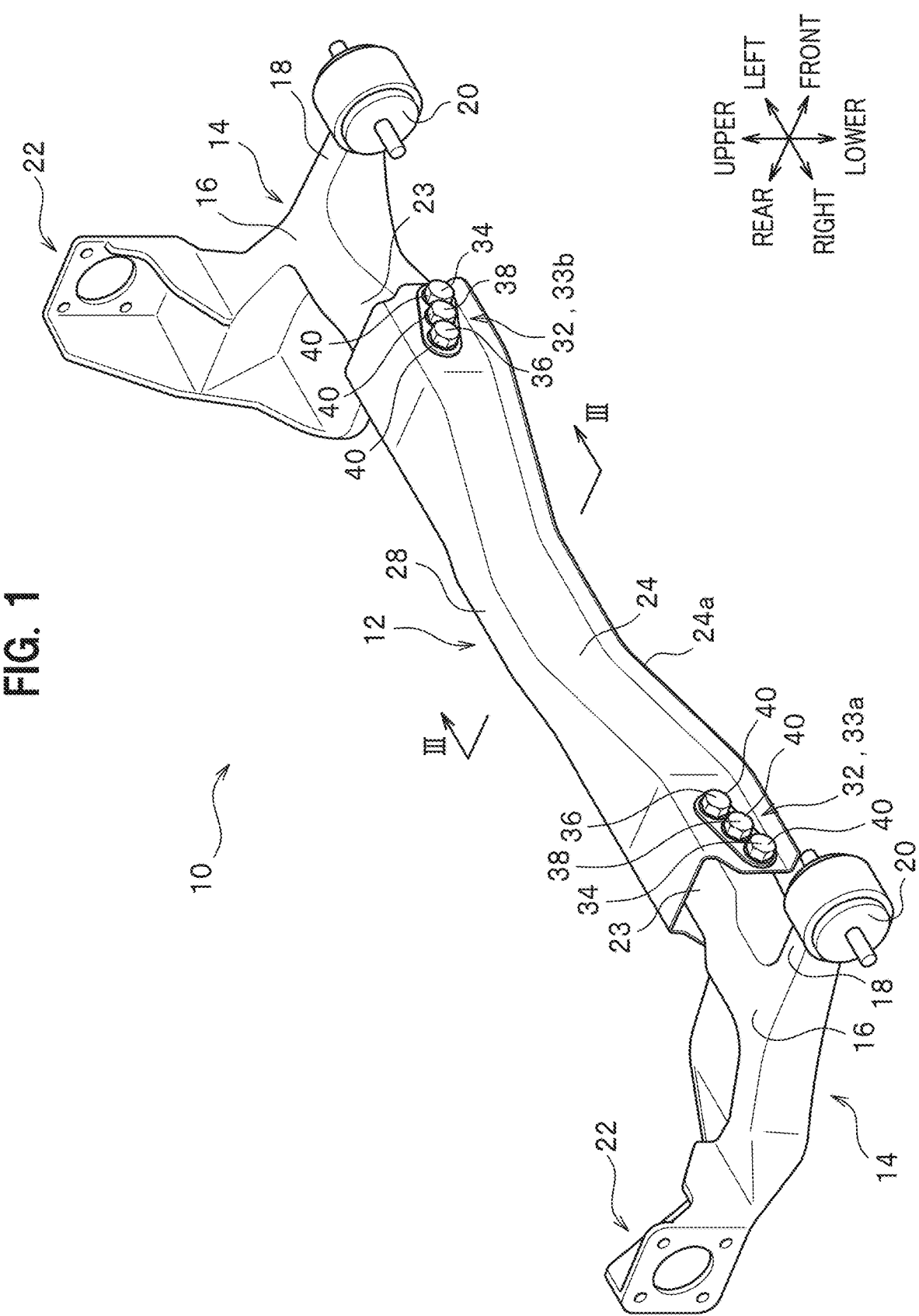
FIG. 1 is a schematic perspective view of a torsion beam rear suspension to which a torsion beam joint structure according to one embodiment of the present invention is applied.

As seen in FIG. 1, a torsion beam rear suspension 10, to which a torsion beam joint structure according to one embodiment of the present invention is applied, includes a torsion beam 12 and a pair of right and left trailing arms 14, 14.

The torsion beam is disposed to extend in a vehicle width direction of a vehicle. A pair of right and left trailing arms 14, 14 are connected to right and left end portions of the torsion beam 12. Because the left trailing arm 14 and the right trailing arm 14 are symmetrical in shape, one (right) trailing arm 14 will be described in detail and an explanation of the other (left) trailing arm 14 will be omitted.

The trailing arm 14 includes an arm body 16, a front extension portion 18, a rubber bushing 20, a hub attachment portion 22, and a beam connection portion 23. The arm body 16 has a generally L-shape in plan view. The front extension portion 18 extends from the arm body 16 toward the front side of the vehicle. The rubber bushing 20 is provided at a front end portion of the front extension portion 18 and is attached to a vehicle body member (not shown in the drawings). The hub attachment portion 22 is provided at an upper rear portion of the arm body 16, and a hub mechanism (not shown in the drawings) is attached to the hub attachment portion 22. The beam connection portion 23 protrudes inward in the vehicle width direction from the arm body 16 by a predetermined length, and is inserted into a right end portion (or a left end portion in the case of the left trailing arm 14) of the torsion beam 12.

Figure 3:
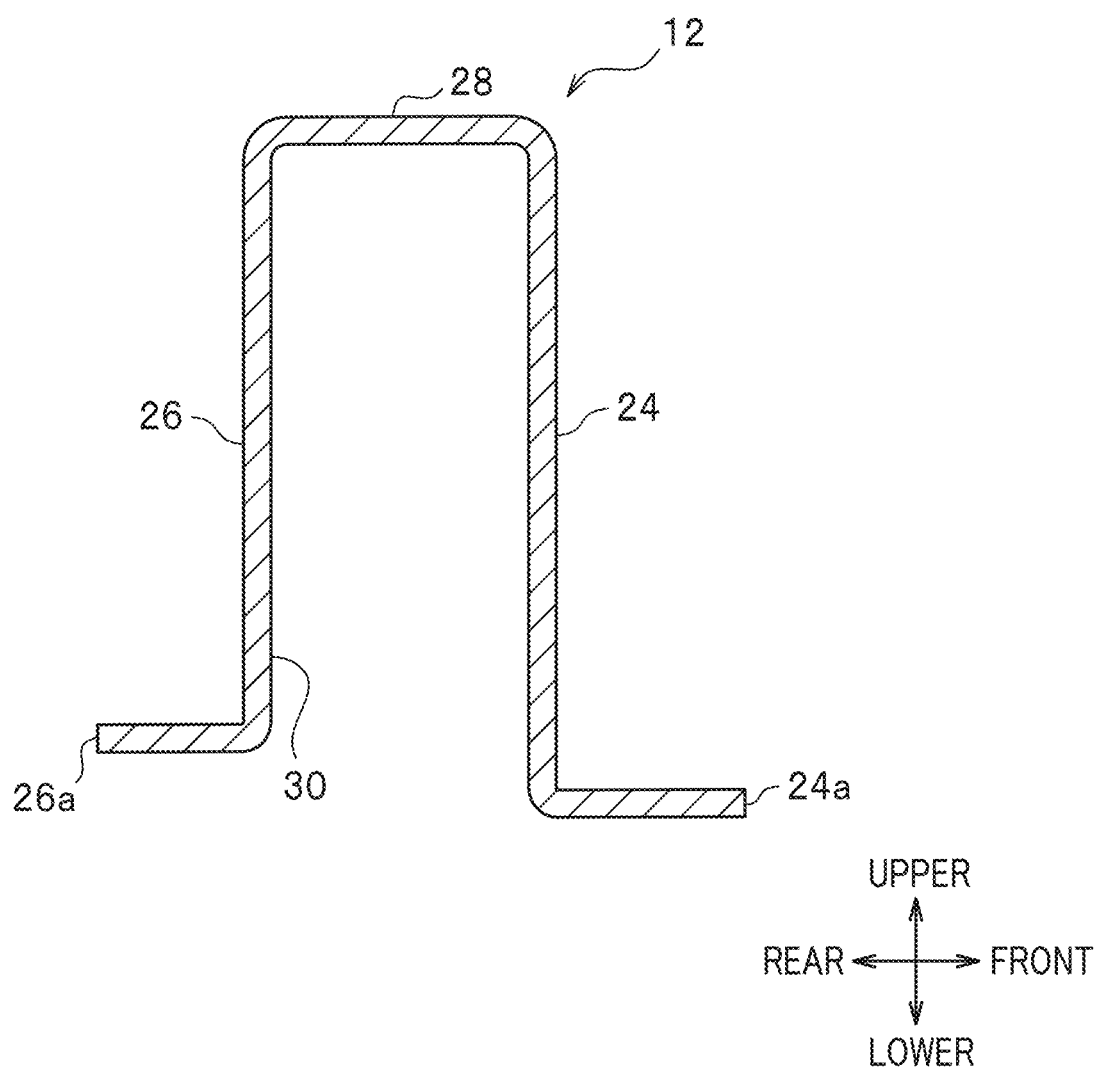
FIG. 3 is an end view taken along the line III-III of FIG. 1.

As seen in FIG. 3, the torsion beam 12 has a U-shaped axial cross-sectional shape, and includes a front wall portion 24 located at a front side in the front-rear direction of the vehicle, a rear wall portion 26 disposed opposite to the front wall portion 24 and located at a rear side in the front-rear direction, and an upper wall portion 28 connecting and bridging between the upper end of the front wall portion 24 and the upper end of the rear wall portion 26. The front wall portion 24, the rear wall portion 26, and the upper wall portion 28 are integrally formed. The torsion beam 12 has an opening 30 provided at a lower side in the upper-lower direction of the vehicle. The opening 30 is provided to open between the lower end of the front wall portion 24 and the lower end of the rear wall portion 26. Note that the lower end of the front wall portion 24 and the lower end of the rear wall portion 26 respectively have a flange portion 24a protruding frontward toward the front side of the vehicle and a flange portion 26a protruding rearward toward the rear side of the vehicle.

Figure 2:
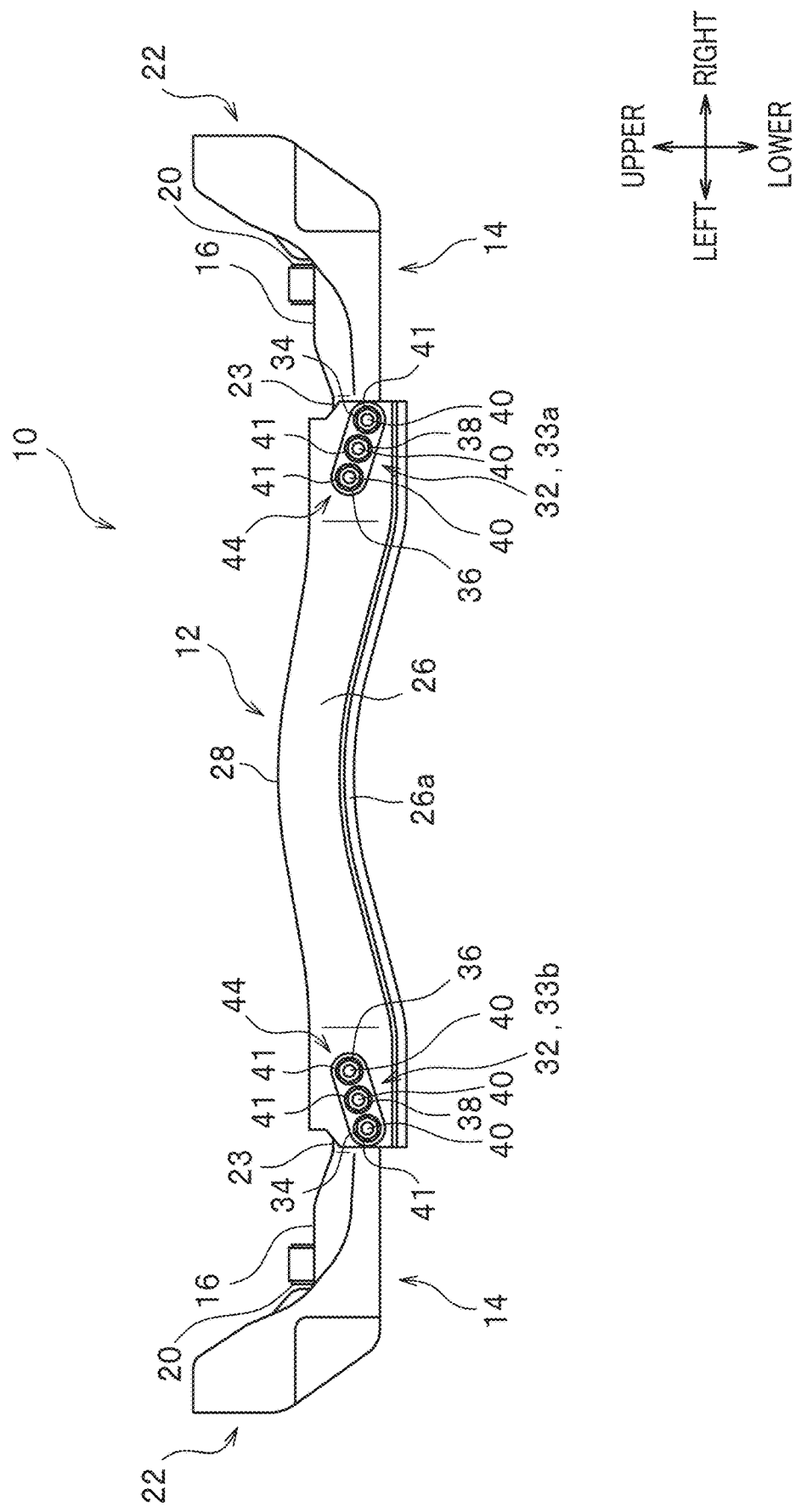
FIG. 2 shows the torsion beam rear suspension of FIG. 1 when viewed from a rear side of a vehicle.

As seen in FIGS. 1 and 2, the front wall portion 24 and the rear wall portion 26 of the torsion beam 12 have end portions along the vehicle width direction, and a set of joint portions 32 (plurality of joint portions 32) is provided in the vicinity of each of these end portions. The front wall portion 24 and the rear wall portion 26 are joined to the trailing arms 14 (beam connection portions 23) by these sets of joint portions 32. When viewed from the front side of the vehicle, the sets of joint portions 32 include first joint portions 33a at one end portion of the torsion beam 12, and second joint portions 33b at the other end portion of the torsion beam 12 opposite to the one end portion.

Figure 4A:
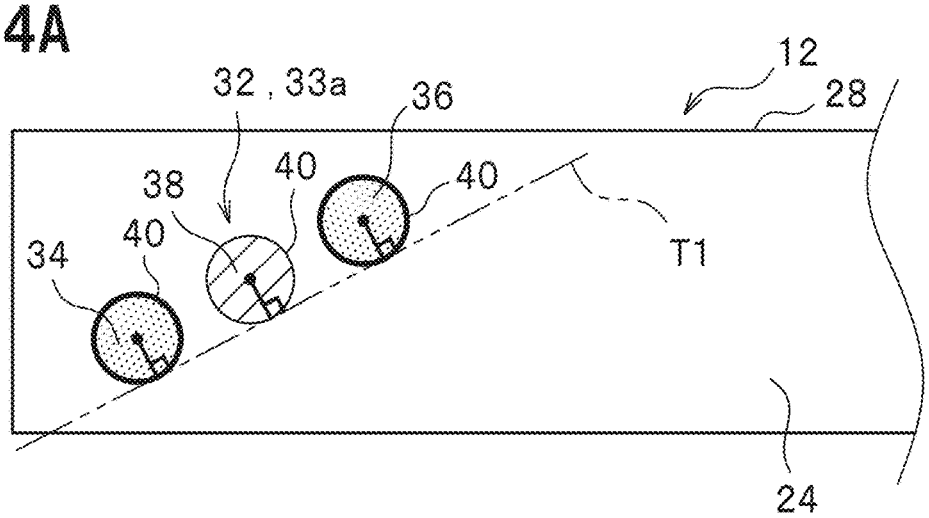
FIG. 4A is a schematic explanatory view showing the relationship of an arrangement between a plurality of joint portions in this embodiment.

As seen in FIG. 4A, each set of joint portions 32 (plurality of joint portions 32) includes an outer joint portion 34, an inner joint portion 36, and an auxiliary joint portion 38. Among the plurality of joint portions 32, the outer joint portion 34 is located on the outer side in the vehicle width direction and at the lowermost position. Among the plurality of joint portions 32, the inner joint portion 36 is located on the inner side in the vehicle width direction and at the uppermost position. The auxiliary joint portion 38 is a joint portion other than the outer joint portion 34 and the inner joint portion 36. The auxiliary joint portion 38 reinforces the outer joint portion 34 and the inner joint portion 36. As described later, one or more auxiliary joint portions 38 may be provided.

The set of joint portions 32 (the plurality of joint portions 32) includes bolts 40 (see FIG. 1) and nuts 41 (see FIG. 2). The bolts 40 are inserted into through holes (not shown) formed in the front wall portion 24 and the rear wall portion 26 of the torsion beam 12 and extend through the front wall portion 24 and the rear wall portion 26. The nuts 41 are fastened to the threaded portions of the bolts 40 at the rear wall portion 26.

In this embodiment, the plurality of joint portions 32 are configured such that the torsion beam 12 and each of the trailing arms 14 are firmly joined to each other by a fastening structure using bolts 40 and nuts 41. However, the present invention is not limited to this specific configuration. The joint portions 32 according to this embodiment includes, for example, rivet fastening using well-known rivets. In this embodiment, the heads of the bolts 40, which are located opposite to the threaded portions, are schematically depicted in a circular shape when viewed from the axial direction of the bolts 40.

Next, the relationship of the arrangement between the plurality of joint portions 32 is explained based on FIG. 4A.

Among the plurality of joint portions 32, the first joint portions 33a and the second joint portions 33b are inclined and arranged in an inverted V-shape when viewed from the front side (rear side) of the vehicle (see FIG. 1 and FIG. 2). In other words, the first joint portions 33a and the second joint portions 33b are inclined and arranged to rise toward the other side.

Further, in the plurality of joint portions 32, the inner joint portion 36 is located higher in the upper-lower direction of the vehicle than the outer joint portion 34 (see FIG. 4A). When viewed in the upper-lower direction of the vehicle, the auxiliary joint portion 38 is located between the inner joint portion 36 that is located upward in the upper-lower direction and the outer joint portion 34 that is located downward in the upper-lower direction. Further, the auxiliary joint portion 38 is disposed to contact the tangent line T1 connecting a lower portion of the outer joint portion 34 and a lower portion of the inner joint portion 36.

Figure 6:
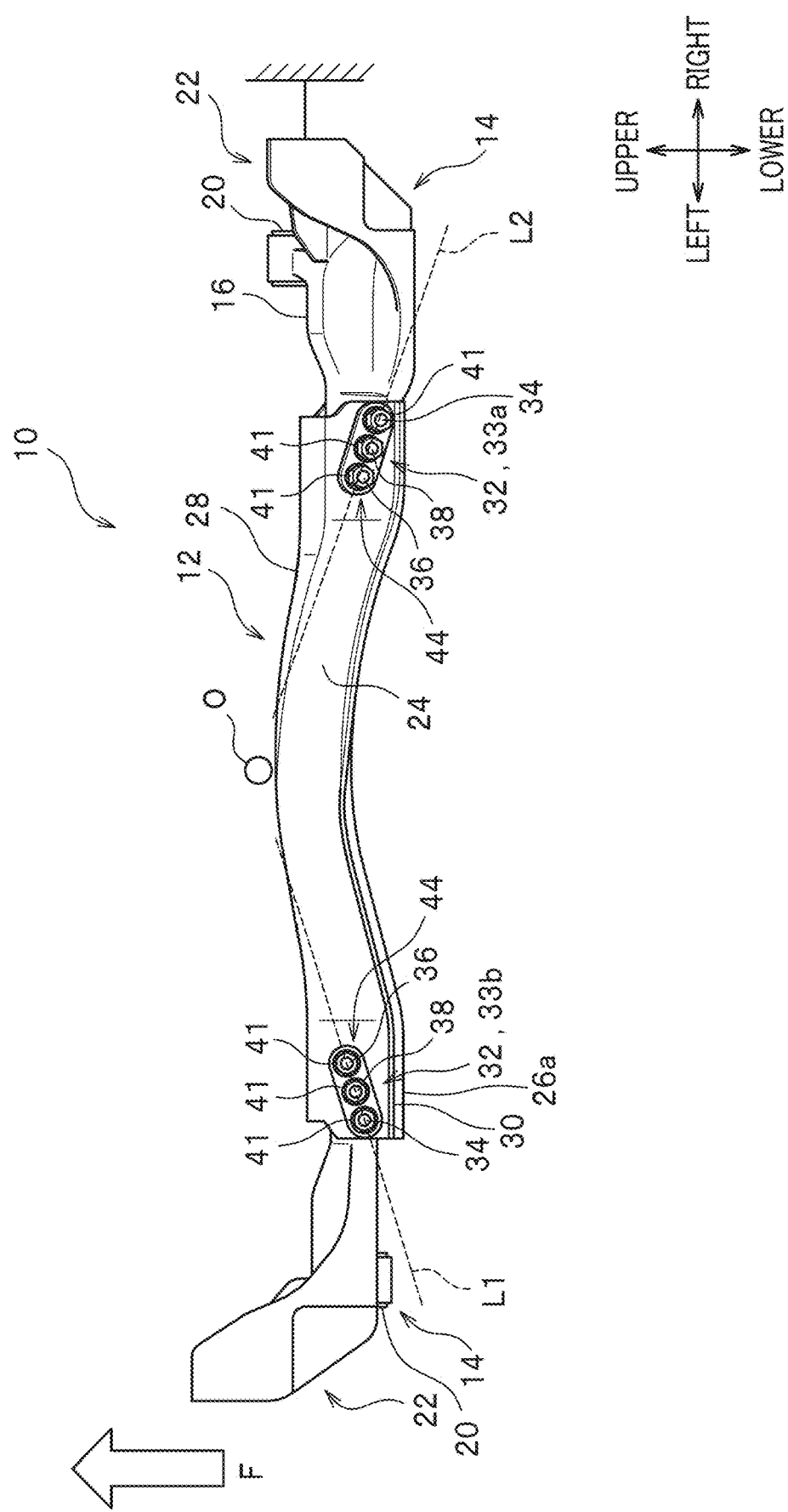
FIG. 6 is an explanatory view illustrating the state in which a torsional force is inputted to one side of a torsion beam.

As shown in FIG. 6, the torsion beam 12 has a torsional center O that is set as the center of torsion when a torsional force (torsional load) F is inputted. The torsional center O of the torsion beam 12 becomes a center when a torsional force (torsional load) F is applied to the torsion beam 12, regardless of the shape of the torsion beam 12. The torsional center O is set in advance when the torsion beam rear suspension 10 is manufactured.

Figure 7:
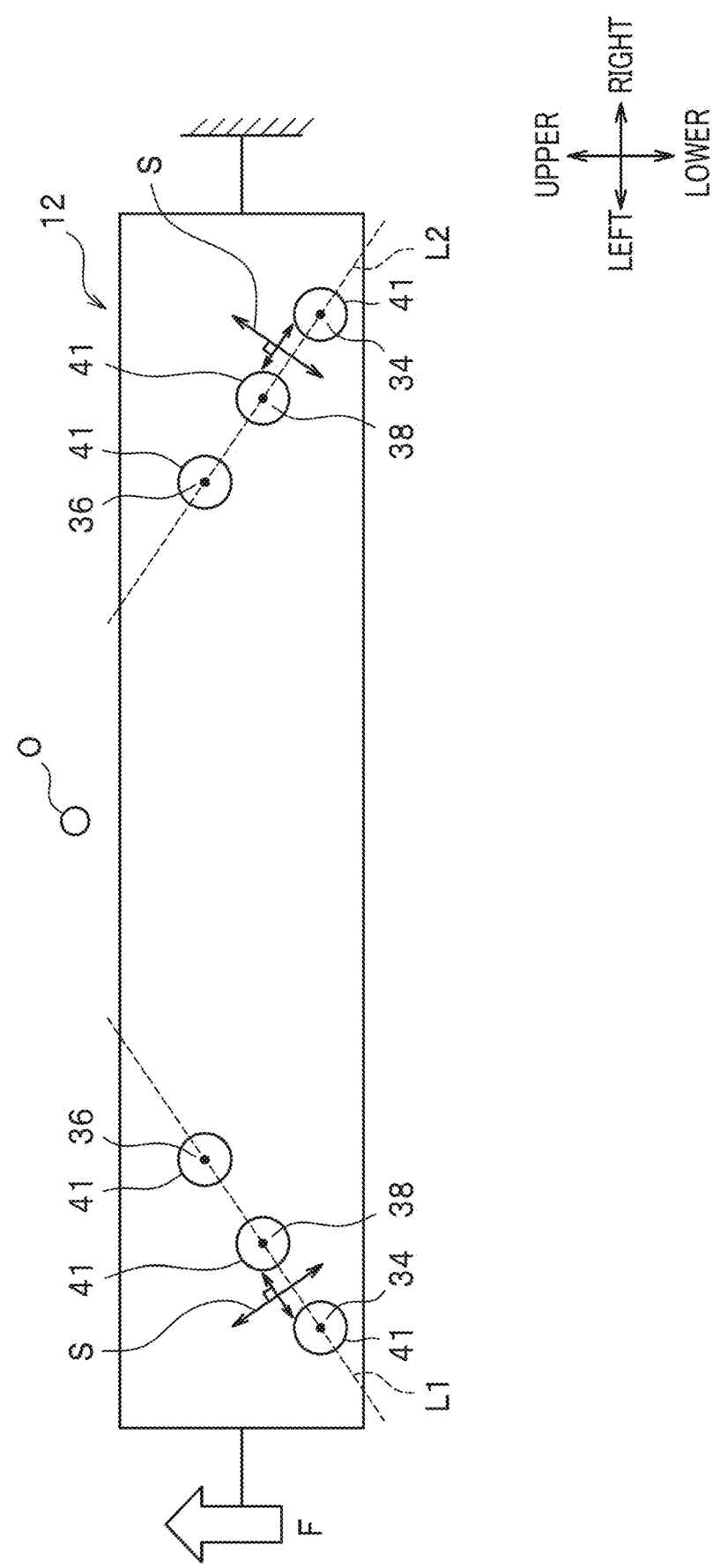
FIG. 7 is a schematic explanatory view schematically explaining the state in which the torsional force shown in FIG. 6 is inputted.

When a torsional force (torsional load) F is inputted to the torsion beam 12, the torsion beam 12 is twisted around the torsional center O, and the maximum principal stress is generated in the torsion beam 12 along the direction of arrow S as shown in FIG. 7. A direction (torsional shear plane) orthogonal to the maximum principal stress direction (direction of arrow S) is indicated by an imaginary line L1 and an imaginary line L2 (see FIGS. 6 and 7). In this embodiment, as seen in FIGS. 6 and 7, the first joint portions 33a (the outer joint portion 34, the auxiliary joint portion 38, and the inner joint portion 36) and the second joint portions 33b (the outer joint portion 34, the auxiliary joint portion 38, and the inner joint portion 36) are arranged such that the centers thereof are aligned with the imaginary line L1 and the imaginary line L2 (directions orthogonal to the maximum principal stress directions (directions of arrows S); torsional shear planes). As a result, in this embodiment, since the plurality of fastening points are arranged in alignment with the imaginary line L1 (torsional shear plane) and the imaginary line L2 (torsional shear plane) that are orthogonal to the maximum principal stress directions (directions of arrows S), a generated stress can be efficiently dispersed.

Figure 5A:
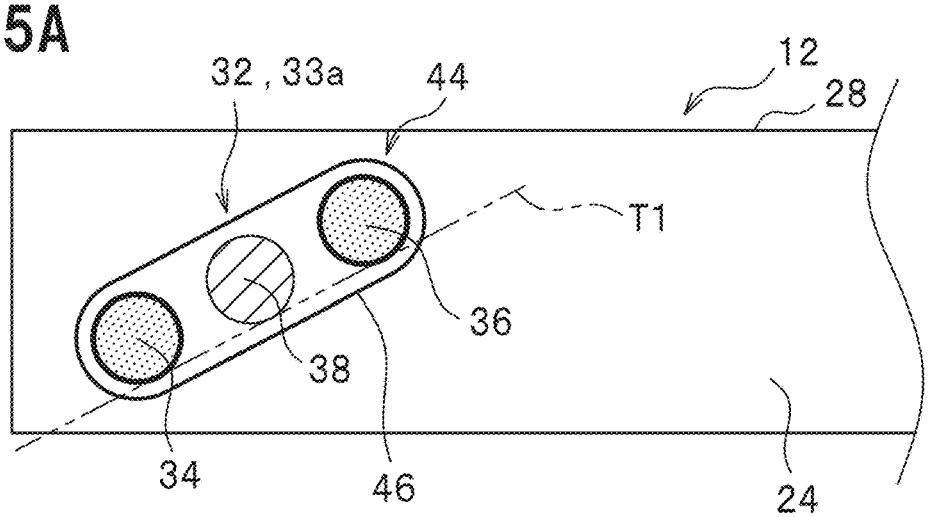
FIG. 5A is a side view showing the shape of a plate according to this embodiment.

Further, as seen in FIG. 5A, the set of joint portions 32 (the plurality of joint portions 32) includes a plate 44 in which a plurality of bolt insertion holes (not shown in the drawings) are formed for insertion of the bolts 40. The plate 44 is a flat plate configuration having a generally oval shape when viewed from the front-rear direction of the vehicle. The plate 44 is disposed on both right and left sides of the front wall portion 24 and on both right and left sides of the rear wall portion 26.

A lower edge portion 46 of an outer edge of the plate 44 is arranged parallel to or substantially parallel to the tangent line T1 connecting the lower portion of the outer joint portion 34 and the lower portion of the inner joint portion 36 (see FIG. 5A).

Figure 5B:
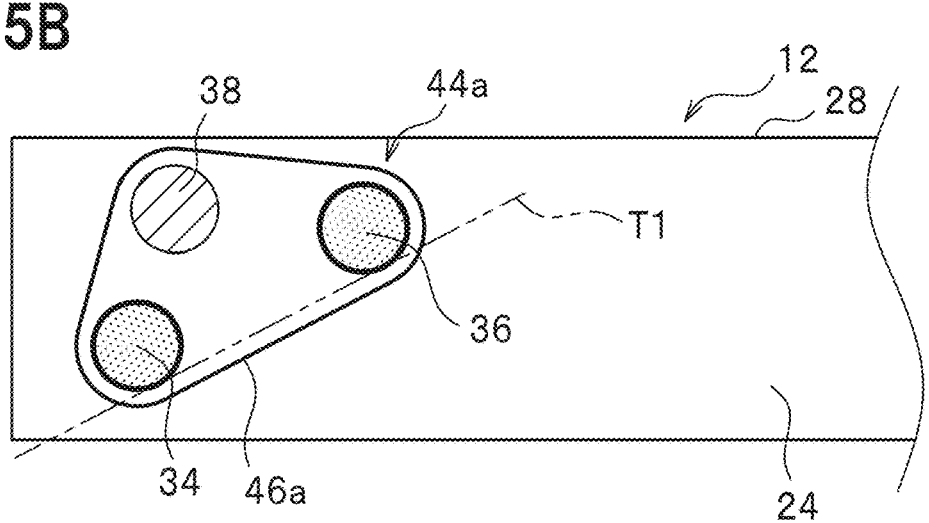
FIG. 5B is a side view showing the shape of a plate according to a modification.

A modification of the plate 44 is shown in FIG. 5B. A plate 44a according to this modified embodiment is different from the plate 44 in that the shape thereof is triangular with chamfered and rounded corners. The outer joint portion 34, the inner joint portion 36, and the auxiliary joint portion 38 are arranged at corners of the plate 44a. The auxiliary joint portion 38 is located higher in the upper-lower direction of the vehicle than the inner joint portion 36. A lower edge portion 46a of an outer edge of the plate 44a forms one side of the triangle. The lower edge portion 46a is arranged parallel to or substantially parallel to the tangent line T1 connecting the lower portion of the outer joint portion 34 and the lower portion of the inner joint portion 36.

Figure 5C:
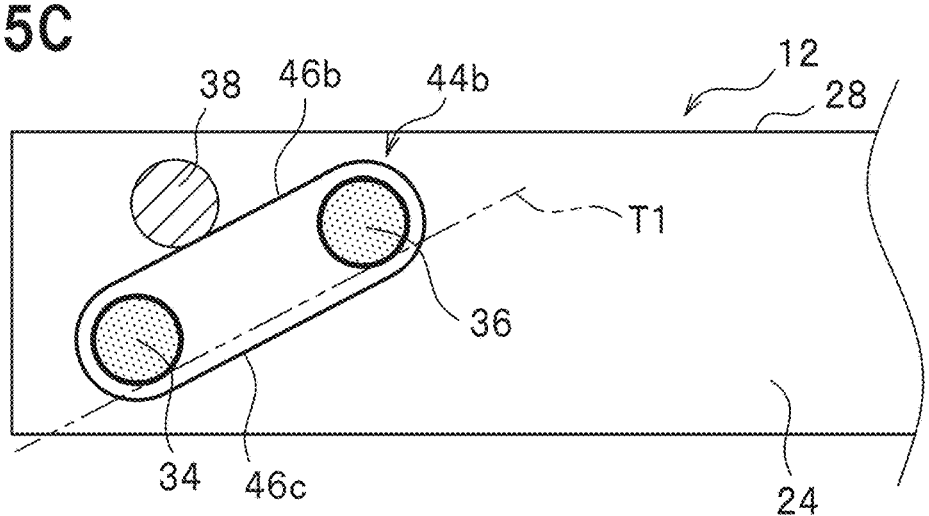
FIG. 5C is a side view showing the shape of a plate according to another modification.

Next, a plate 44b according to another modification is shown in FIG. 5C. In the plate 44b according to this another modified embodiment, the outer joint portion 34 is disposed at an outer lower portion of the plate 44b having a generally oval shape and the inner joint portion 36 is disposed at an inner upper portion of the plate 44b. The auxiliary joint portion 38 is disposed outside the plate 44b and above an upper edge portion 46b of the outer edge of the plate 44b. A lower edge portion 46c of the outer edge of the plate 44b according to another modification is arranged parallel to or substantially parallel to the tangent line T1 connecting the lower portion of the outer joint portion 34 and the lower portion of the inner joint portion 36.

The torsion beam rear suspension 10, to which the torsion beam joint structure according to this embodiment is applied, is basically configured as described above. Advantageous effects of the torsion beam rear suspension 10 are described below.

In this embodiment, the torsion beam 12 has a U-shaped axial cross-sectional shape, and includes the front wall portion 24 located at the front side in the front-rear direction of the vehicle, the rear wall portion 26 disposed opposite to the front wall portion 24 and located at the rear side in the front-rear direction, and the upper wall portion 28 connecting and bridging between the upper end of the front wall portion 24 and the upper end of the rear wall portion 26. The front wall portion 24, the rear wall portion 26, and the upper wall portion 28 are integrally formed. The torsion beam 12 has the opening 30 provided at the lower side in the upper-lower direction of the vehicle. The opening 30 is provided to open between the lower end of the front wall portion 24 and the lower end of the rear wall portion 26.

The front wall portion 24 and the rear wall portion 26 of the torsion beam 12 have end portions along the vehicle width direction, and a set of joint portions 32 (plurality of joint portions 32) is provided in the vicinity of each of these end portions. The front wall portion 24 and the rear wall portion 26 are joined to the trailing arms 14 (beam connection portions 23) by these sets of joint portions 32. When viewed from the front side of the vehicle, the sets of joint portions 32 include the first joint portion 33a at one end portion of the torsion beam 12, and the second joint portion 33b at the other end portion of the torsion beam 12 opposite to the one end portion. The first joint portions 33a and the second joint portions 33b are inclined and arranged in an inverted V-shape when viewed from the front side of the vehicle. In other words, the first joint portions 33a and the second joint portions 33b are inclined and arranged to rise toward the other side.

Further, each set of joint portions 32 includes, among the plurality of joint portions 32, the outer joint portion 34 located on the outer side in the vehicle width direction and at the lowermost position, and the inner joint portion 36 located on the inner side in the vehicle width direction and at the uppermost position. Among the plurality of joint portions 32, the inner joint portion 36 is located higher in the upper-lower direction of the vehicle than the outer joint portion 34.

As seen in FIG. 6, for example, when a lateral force is inputted, causing the right and left rear wheels to be in opposite phases, a torsional force F is applied to one side of the torsion beam 12. This torsional force F results in stress concentration at the first joint portions 33a (or the second joint portions 33b) as the set of joint portions 32 (plurality of joint portions 32). However, according to this embodiment, the pluralities of joint portions 32 are arranged in a generally inverted V-shape (See FIG. 7) to align with the imaginary lines L1 and L2 (torsional shear planes). These imaginary lines L1 and L2 are orthogonal to the directions of the maximum principal stress (directions of arrows S in FIG. 7) generated when the torsional force F is inputted to the torsion beam 12. This arrangement can enhance durability by distributing the stress to be generated without restricting the torsional motion of the torsion beam 12. Thus, this embodiment offers a torsion beam joint structure that can enhance durability in the torsion mode without restricting the torsional motion of the torsion beam 12. As a result, in this embodiment, while maintaining the same strength and rigidity as the conventional torsion beam joint structure, the weight reduction can be achieved, for example, by reducing the thickness of the front wall portion 24, the rear wall portion 26, and the upper wall portion 28 of the torsion beam 12.

In this embodiment, a plate 44 is provided on the front wall portion 24 and the rear wall portion 26 of the torsion beam 12 (see FIG. 5A). The plate 44 is configured to connect the inner joint portion 36 and the outer joint portion 34. The lower edge portion 46 of the outer edge of the plate 44 is arranged parallel to or substantially parallel to the tangent line T1 connecting the lower portion of the outer joint portion 34 and the lower portion of the inner joint portion 36.

According to this embodiment, the lower edge portion 46 of the outer edge of each plate 44 is arranged parallel to or substantially parallel to the direction (torsional shear plane) that is orthogonal to the direction of the maximum principal stress (direction of the arrow S in FIG. 7) generated when the torsional force F is inputted. This arrangement can enhance durability by reducing stress generated at the plurality of joint portions 32 without restricting the torsional motion of the torsion beam 12. If the thickness of the entire torsion beam 12 is increased, it may prevent torsion of the torsion beam 12, resulting in elevated stress throughout the torsion beam 12. However, in this embodiment, only the area surrounding the plurality of joint portions 32 is reinforced by the plate 44. This arrangement can enhance the rigidity and strength of the plurality of joint portions 32 and reduce stress throughout the torsion beam 12. Further, this arrangement of the plate 44 for reinforcing only the area surrounding the plurality of joint portions 32 results in a reduced overall weight of the torsion beam 12.

Figure 4B:
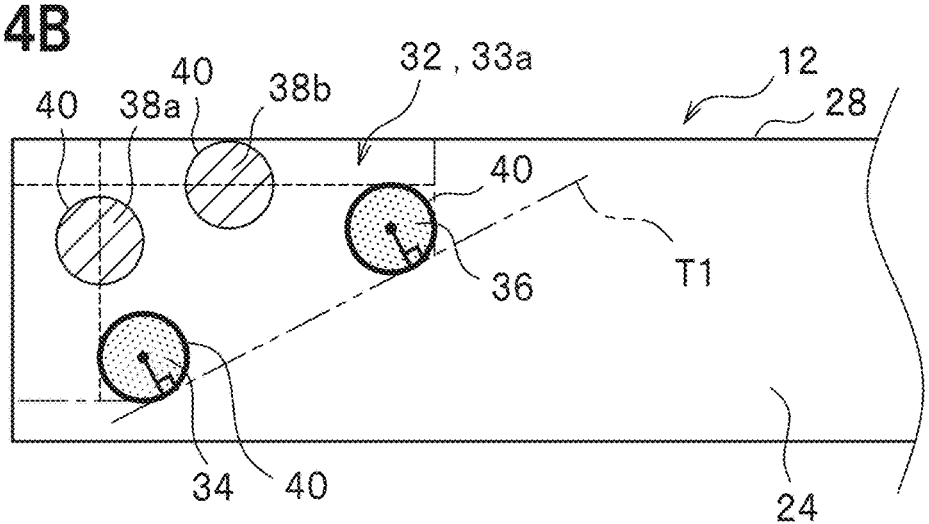
FIG. 4B is a schematic explanatory view showing the relationship of an arrangement between a plurality of joint portions according to a first modification.

Next, modifications of this embodiment are described. FIG. 4B is a schematic explanatory view showing the relationship of an arrangement between the plurality of joint portions according to a first modification. As seen in FIG. 4B, the first modification includes two auxiliary joint portions consisting of a first auxiliary joint portion 38a and a second auxiliary joint portion 38b. As compared to the outer joint portion 34, the first auxiliary joint portion 38a is located outward in the vehicle width direction and at a higher position in the upper-lower direction of the vehicle. Further, as compared to the inner joint portion 36, the second auxiliary joint portion 38b is located outward in the vehicle width direction and at a higher position in the upper-lower direction of the vehicle. In the upper-lower direction of the vehicle, the first auxiliary joint portion 38a and the second auxiliary joint portion 38b are located above the tangent line T1 connecting a lower portion of the outer joint portion 34 and a lower portion of the inner joint portion 36. Note that for the purpose of illustration, each of the joint portions 34, 36, 38, 38a, 38b is circular in lateral view.

According to the first modification, the first auxiliary joint portion 38a and the second auxiliary joint portion 38b are arranged either at higher positions in the upper-lower direction of the vehicle or at positions closer to the trailing arm 14, or at positions in a combination of these positions. This arrangement can enhance durability of the torsion beam 12 without restricting the torsional motion of the torsion beam 12. As a result, in the first modification, the durability of the torsion beam 12 can be enhanced without increasing the thickness of the torsion beam 12.

If the first auxiliary joint portion 38a and the second auxiliary joint portion 38b are arranged in the upper-lower direction of the vehicle below the tangent line T1 connecting the lower portion of the outer joint portion 34 and the lower portion of the inner joint portion 36, it may lead to a problem that the torsional motion of the torsion beam 12 is disrupted and the torsion beam 12 cannot twist completely. Accordingly, it is preferable that the plurality of joint portions 32, including the first auxiliary joint portion 38a and the second auxiliary joint portion 38b, are not arranged in a region below the tangent line T1.

Figure 4C:
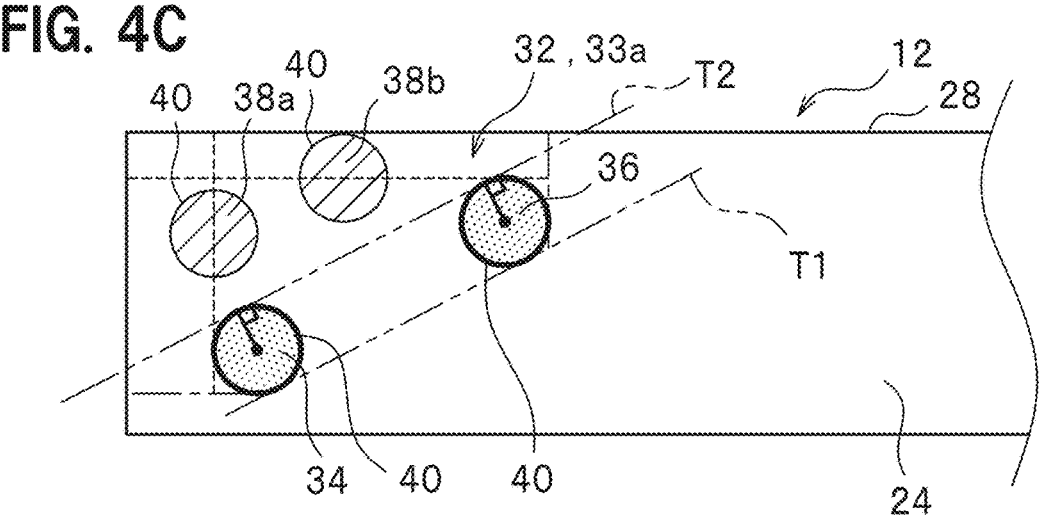
FIG. 4C is a schematic explanatory view showing the relationship of an arrangement between a plurality of joint portions according to a second modification.

FIG. 4C is a schematic explanatory view showing the relationship of an arrangement between the plurality of joint portions according to a second modification. As seen in FIG. 4C, as with the first modification, the second modification includes two auxiliary joint portions consisting of the first auxiliary joint portion 38a and the second auxiliary joint portion 38b. In the upper-lower direction of the vehicle, the first auxiliary joint portion 38a and the second auxiliary joint portion 38b are located above the tangent line T2 connecting an upper portion of the outer joint portion 34 and an upper portion of the inner joint portion 36.

As with the first modification, the second modification can enhance durability of the torsion beam 12 without restricting the torsional motion of the torsion beam 12.

What is claimed is:

1. A torsion beam joint structure in a torsion beam suspension comprising a torsion beam disposed to extend in a vehicle width direction of a vehicle, and a pair of right and left trailing arms connected to right and left end portions of the torsion beam, wherein
    the torsion beam has a front wall portion located at a front side in a front-rear direction of the vehicle, a rear wall portion located at a rear side in the front-rear direction, and an upper wall portion connecting and bridging between the front wall portion and the rear wall portion, and the torsion beam has an opening provided at a lower side in an upper-lower direction of the vehicle,
    the front wall portion and the rear wall portion have a set of joint portions on their right side and left side in the vehicle width direction, by which the front wall portion and the rear wall portion are joined to each of the trailing arms,
    the set of joint portions includes an outer joint portion located on an outer side in the vehicle width direction and at a lowermost position, and an inner joint portion located on an inner side in the vehicle width direction and at an uppermost position,
    the inner joint portion is located higher in the upper-lower direction of the vehicle than the outer joint portion,
    the set of joint portions further includes an auxiliary joint portion, and
    in the upper-lower direction of the vehicle, the auxiliary joint portion is located above a tangent line connecting a lower portion of the outer joint portion and a lower portion of the inner joint portion.

2. The torsion beam joint structure according to claim 1, wherein
    the joint portions are circular in shape.

3. A torsion beam joint structure in a torsion beam suspension comprising a torsion beam disposed to extend in a vehicle width direction of a vehicle, and a pair of right and left trailing arms connected to right and left end portions of the torsion beam, wherein
    the torsion beam has a front wall portion located at a front side in a front-rear direction of the vehicle, a rear wall portion located at a rear side in the front-rear direction, and an upper wall portion connecting and bridging between the front wall portion and the rear wall portion, and the torsion beam has an opening provided at a lower side in an upper-lower direction of the vehicle,
    the front wall portion and the rear wall portion have a set of joint portions on their right side and left side in the vehicle width direction, by which the front wall portion and the rear wall portion are joined to each of the trailing arms,
    the set of joint portions includes an outer joint portion located on an outer side in the vehicle width direction and at a lowermost position, and an inner joint portion located on an inner side in the vehicle width direction and at an uppermost position,
    the inner joint portion is located higher in the upper-lower direction of the vehicle than the outer joint portion,
    the set of joint portions further includes an auxiliary joint portion, and
    in the upper-lower direction of the vehicle, the auxiliary joint portion is located above a tangent line connecting an upper portion of the outer joint portion and an upper portion of the inner joint portion.

4. The torsion beam joint structure according to claim 3, wherein
    the joint portions are circular in shape.

5. A torsion beam joint structure in a torsion beam suspension comprising a torsion beam disposed to extend in a vehicle width direction of a vehicle, and a pair of right and left trailing arms connected to right and left end portions of the torsion beam, wherein
    the torsion beam has a front wall portion located at a front side in a front-rear direction of the vehicle, a rear wall portion located at a rear side in the front-rear direction, and an upper wall portion connecting and bridging between the front wall portion and the rear wall portion, and the torsion beam has an opening provided at a lower side in an upper-lower direction of the vehicle,
    the front wall portion and the rear wall portion have a set of joint portions on their right side and left side in the vehicle width direction, by which the front wall portion and the rear wall portion are joined to each of the trailing arms,
    the set of joint portions includes an outer joint portion located on an outer side in the vehicle width direction and at a lowermost position, and an inner joint portion located on an inner side in the vehicle width direction and at an uppermost position, the inner joint portion is located higher in the upper-lower direction of the vehicle than the outer joint portion,
the torsion beam joint structure further includes a plate configured to connect the inner joint portion and the outer joint portion, and
a lower portion of an outer edge of the plate is arranged substantially parallel to a tangent line connecting a lower portion of the outer joint portion and a lower portion of the inner joint portion.

* * * * *